United States Patent [19]

Watanabe et al.

[11] Patent Number: 4,581,618

[45] Date of Patent: Apr. 8, 1986

[54] RECORDER HAVING PAPER FEED MECHANISM

[75] Inventors: Yoshitaka Watanabe, Tokyo; Takashi Endo, Machida, both of Japan

[73] Assignee: Canon Kabushiki Kaisha, Tokyo, Japan

[21] Appl. No.: 585,934

[22] Filed: Mar. 5, 1984

[30] Foreign Application Priority Data

| | | | |
|---|---|---|---|
| Mar. 9, 1983 | [JP] | Japan | 58-38864 |
| Mar. 9, 1983 | [JP] | Japan | 58-38865 |
| Mar. 31, 1983 | [JP] | Japan | 58-56354 |

[51] Int. Cl.[4] .................. G01D 15/28

[52] U.S. Cl. .................. 346/134; 271/4; 271/273; 346/140 R; 400/185; 400/625; 400/636.1; 400/639.1; 400/646; 400/902

[58] Field of Search .................. 346/134, 138, 140; 271/3, 4, 273, 274, 275; 400/126, 625, 629, 636, 902, 185, 636.1, 639.1, 646; 355/35 H

[56] References Cited

U.S. PATENT DOCUMENTS

| | | | |
|---|---|---|---|
| 4,089,402 | 5/1978 | Hyland | 400/625 |
| 4,113,244 | 9/1978 | Ruenzi | 271/4 |
| 4,268,021 | 5/1981 | Rutishauser | 271/4 |
| 4,488,830 | 12/1984 | Runzi | 400/636 |

*Primary Examiner*—Joseph W. Hartary

*Attorney, Agent, or Firm*—Fitzpatrick, Cella, Harper & Scinto

[57] ABSTRACT

A recorder comprises first drive means for feeding a record paper to a stand-by position, second drive means for feeding the record paper from the stand-by position to a record position, and transport means for retracting a retainer which retains the record paper at the record position, during the operation of the first drive means and returning the retainer to the record position in response to the feed of the record paper during the operation of the second drive means.

27 Claims, 3 Drawing Figures

RECORDER HAVING PAPER FEED MECHANISM

BACKGROUND OF THE INVENTION

1. Field of the Invention

The present invention relates to a recorder for an image signal, and more particularly to a recorder having a feed mechanism for a record paper.

2. Description of the Prior Art

Various automatic paper feed mechanisms for cut forms have been proposed as a record paper feed mechanism of a recorder used in a printer such as a typewriter and an ink jet printer. However, those mechanisms are complex in structure, expensive or frequently cause paper jam. In an image printer such as a full color printer in which principal colors such as cyan, magenta, yellow and black are printed on the paper to print out various colors, an instability in the paper feed is reflected on the recorded image and causes degradation of the image. Accordingly, a series of steps from loading of the paper to the paper feed during the recording must be exactly carried out. Since an external disturbance such as touching to the paper during the recording by a hand significantly degrades the record quality, the recorder must be constructed to prevent inadvertent touching to the paper by the hand during the recording.

As a record paper retainer of the recorder, a structure which urges a pinch roller to a platen by a spring and a structure which urges the record paper to the platen by a spring have been proposed. In the former structure, because of unbalance of the springs at the opposite ends of the pinch roller, a track of the record paper is disordered and an operator must retract the pinch roller when he or she loads the record paper. In the latter structure, the record paper is damaged by an edge of the spring and the retaining force is ununiform because of a variance of a precision of the leaf spring.

Paper feed means of the recorder is classified into an automatic paper feed which uses a paper cassette and a manual paper feed which feeds the papers to the recorder one by one. The automatic paper feed which uses the paper cassette is complex in structure and expensive. The manual paper feed is complex to operate and the paper may be skewed.

In a recorder which directly ejects the recorded paper to an external, the record paper may be touched by the hand immediately after the recording by an ink. In this case, not only the exact paper feed is affected but also the recorded image is contaminated.

SUMMARY OF THE INVENTION

It is an object of the present invention to provide a recorder which is highly reliable, has a high space efficiency and is of low cost.

It is another object of the present invention to provide a recorder which exactly carries out a series of steps including loading of a record paper, feeding of the record paper to a record position and feeding of the record paper during a record operation.

It is other object of the present invention to provide a recorder in which first drive means for feeding a record paper to a stand-by position and second drive means for feeding the record paper from the stand-by position to a record position exactly carry out automatic paper feed and paper feed without affecting to each other, so that a high quality of print or record is attained.

It is other object of the present invention to provide a recorder in which the above first and second drive means are successively driven by a common drive source so that the first and second drive means exactly feed the paper by a simple and reliable mechanism without affecting to each other so that a high quality of print or record is attained.

It is other object of the present invention to provide a recorder which has record paper retain means for retaining the record paper at a constant retaining force to allow stable paper feed.

It is other object of the present invention to provide a recorder which has feed-in and feed-out means of high operability.

It is other object of the present invention to provide a recorder which can feed in and out a record paper with a simple construction and prevents a recorded paper from being touched by a hand.

The above and other objects of the present invention will be apparent from the following description of the invention.

DETAILED DESCRIPTION OF THE PREFERRED EMBODIMENTS

Figure 1:
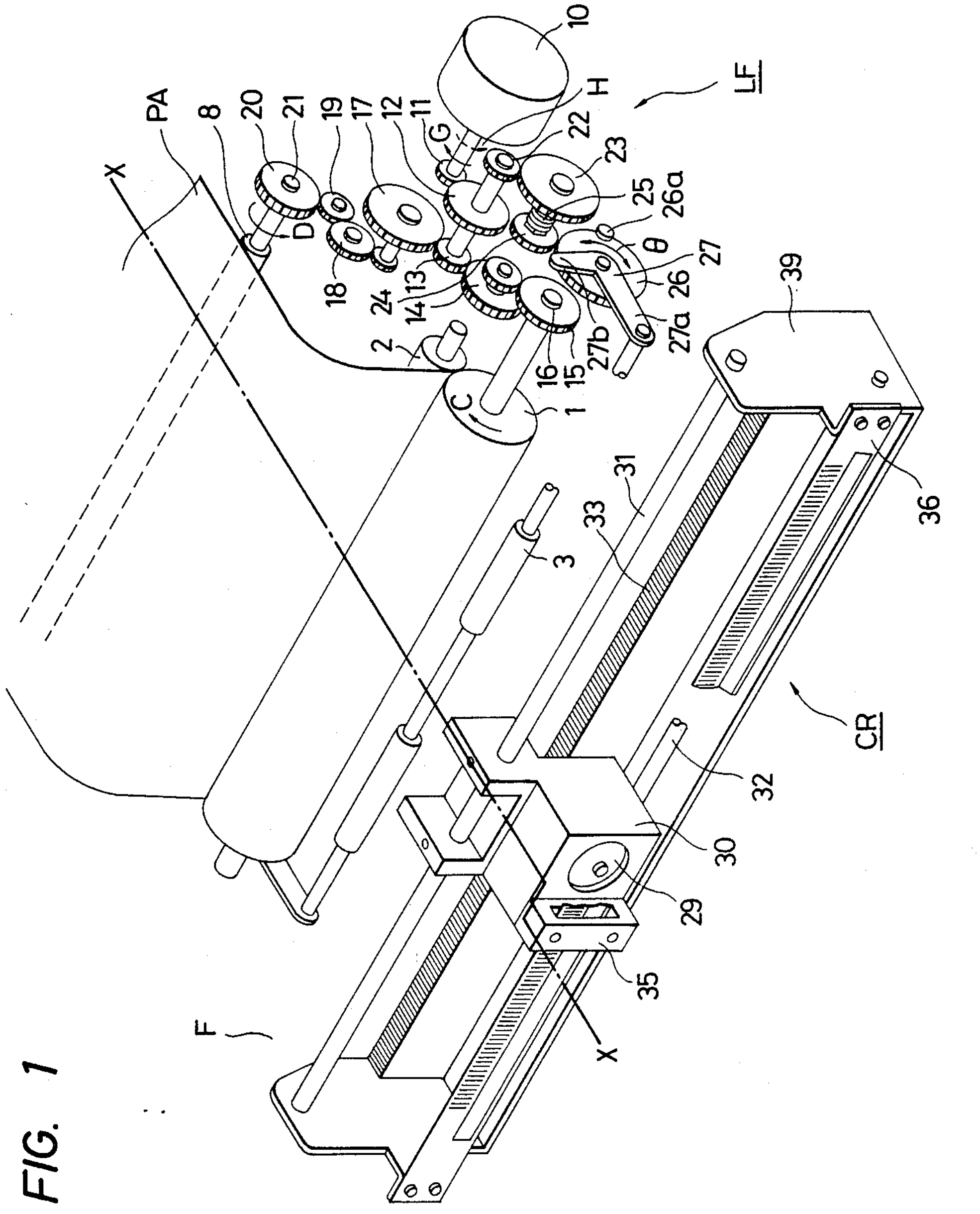
FIG. 1 is a perspective view of one embodiment of a printer of the present invention.
Figure 2:
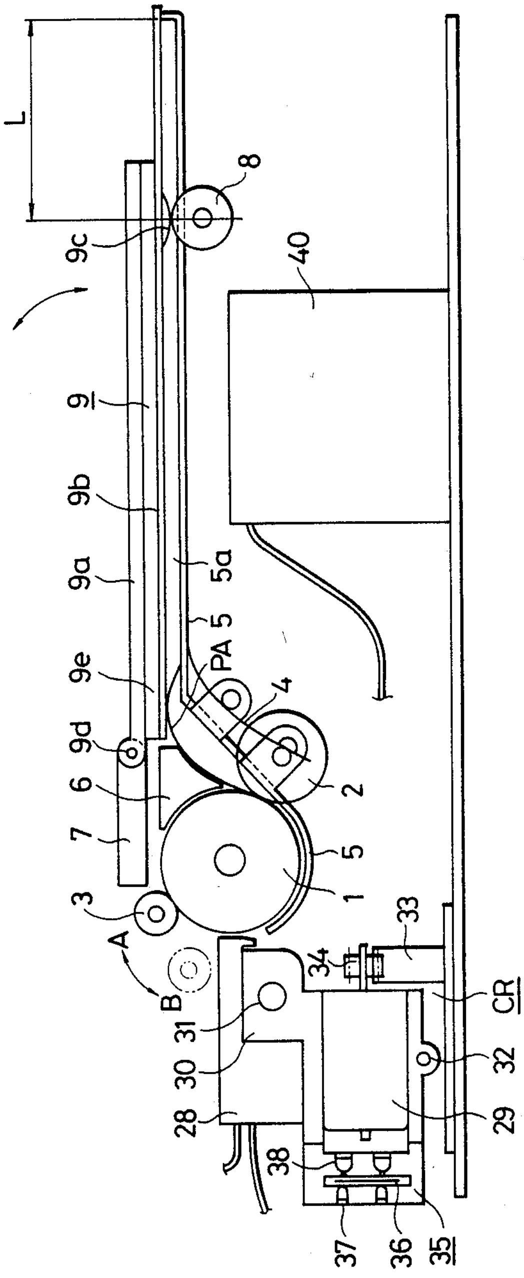
FIG. 2 is a sectional view taken along a line X—X in FIG. 1.

FIG. 1 is a perspective view of an embodiment of a recorder of the present invention, and FIG. 2 is a sectional view taken along a line X—X of FIG. 1. In those figures, LF denotes a paper feed mechanism and CR denotes a print recording mechanism.

In the paper feed mechanism LF, numeral 1 denotes a paper feed platen mode of high friction material such as rubber, numeral 2 denotes a first pinch roller which is biased by a spring 4 toward the platen 1, numeral 3 denotes a second movable pinch roller driven by a mechanism to be described later, numerals 5, 6 and 7 denote paper guide members, numeral 8 denotes a paper feed roller made of rubber and numeral 9 denotes a cover unit which comprises an upper cover 9*a*, a lower cover 9*b* and a paper pusher 9*c* and rotatably fitted to a main body of the recoder (not shown) and a hinge 9*d*. A paper feed-in port 5*a* is formed between the lower cover 9*b* and the paper guide member 5, and a paper feed-out port 9*e* is formed between the upper cover 9*a* and the lower cover 9*b*. The upper cover 9*a* is made of a transparent member and the upper cover 9*a* and the lower cover 9*b* are integral and rotatably attached to the main body.

To load a record paper PA, the cover unit 9 is opened and rotated counterclockwise in FIG. 2 to move it away from the paper feed roller 8, and the paper cut in a predetermined size is inserted into the paper feed-in unit 5*a*, and the cover unit 9 is rotated clockwise to close the cover so that the cover unit 9 is set in the position shown by a lock mechanism not shown. Thus, the record paper PA is set between the paper pusher 9*c* and the paper feed roller 8 with a constant pressure. The recorded paper is guided by the paper guide members 6 and 7 and fed to the paper feed port 9*e*, thence it is fed out or taken out.

With this arrangement, the record paper PA can be fed in and out by the simple structure of the upper cover 9a and the lower cover 9b and a manufacturing cost of the recorder is reduced. Since the upper cover 9a is made of the transparent member, the recorded image can be externally observed during the record operation. Further, since the upper cover 9a and the lower cover 9b are rotatably attached to the main body, the record paper PA can be readily loaded and the feed-in and the feed-out of the record paper are assured. Since the length of the upper cover 9a in the direction of feed of the record paper is shorter than that of the lower cover 9b, the record paper can be readily taken out.

Numeral 10 denotes a paper feed pulse motor. In a preferred embodiment of the present invention, it is common drive means to the platen 1 and the paper feed roller 8. Numerals 11, 12, 13, 14 and 15 denote gears which transmit a torque of the pulse motor 10 to rotate the platen 1. Gear ratios of those gears are determined by a rotation angle of the pulse motor 10 and a paper feed pitch. Numeral 16 denotes a known one-way clutch which couples the platen 1 to the gear 15 to rotate the platen 1 only in a direction C in FIG. 1. Numerals 17, 18, 19 and 20 denote gears which transmit the torque of the pulse motor 10 to drive the paper feed roller 8. Numeral 21 denotes a known one-way clutch which couples the paper feed roller 8 to the gear 20 to drive the paper feed roller only in a direction D in FIG. 1.

Numerals 22, 23, 24 and 26 denote gears which transmit the torque of the pulse motor 10 to move the movable pinch roller 3. The gears 23 and 24 are coupled by a known friction clutch 25 to transmit a smaller torque than a predetermined level to the movable pinch roller 3. The gear 26 has a pin 26a which drives a lever 27. The lever 27 supports the movable pinch roller 3 and is coaxially fitted to the gear 26. Numerals 27a and 27b denote branches of the lever 27 having an opening angle $\theta$ therebetween.

In the print recording mechanism CR, numeral 28 denotes a known ink jet as a record head, numeral 29 denotes a carriage motor, and numeral 30 denotes a carriage body. The head 28 and a sensor 35 to be described later are mounted on the carriage 30, and the carriage motor 29 is accommodated in the carriage body 30 and mounted thereto. Numerals 31 and 32 denote guides which are fitted to the carriage 30. Numeral 33 denotes a rack gear and numeral 34 denotes a motor pinion gear which meshes with the rack gear 33 to move the carriage in a main scan direction. Numeral 35 denotes a sensor for sensing a position of the carriage 30 in the main scan direction. It is a known photo-coupler comprising a linear encoder 36, a light emitting device 37 and a photo-sensor 38. Numeral 39 denotes a support plate which supports the guides 31 and 32, the rack 33 and the encorder 36. Numeral 40 in FIG. 2 denotes an ink tank.

Figure 3:
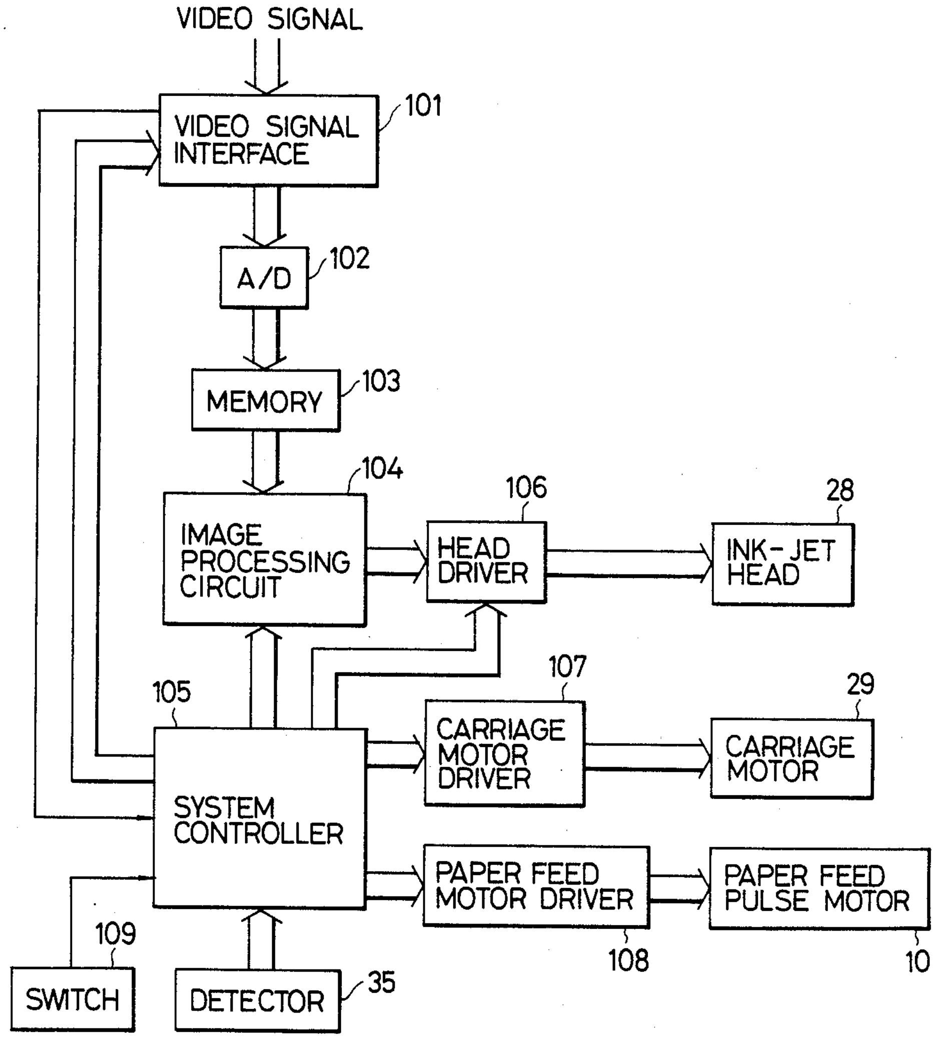
FIG. 3 is a control unit of the recorder of FIGS. 1 and 2.

FIG. 3 shows a control unit of the recorder shown in FIGS. 1 and 2. Numeral 101 denotes a video signal interface, numeral 102 denotes an A-D converter, numeral 103 denotes a memory, numeral 104 denotes an image processing circuit, numeral 105 denotes a system controller, numeral 106 denotes a head driver which drives the ink jet head 28 by an output of the image processing circuit 104, numeral 107 denotes a driver for the carriage motor 29 which is controlled by the sensor 35 and the system controller 105 to control the carriage motor 29, numeral 108 denotes a driver for the paper feed pulse motor 10, which is controlled by the system controller 105, and numeral 109 denotes a start switch which is turned on and off by the opening and closing operation of the cover unit 9 or a manual operation.

The operation of the recorder of FIGS. 1–3 is now explained.

(1) In an initial state, the carriage main body 30 is located at an initial position (F in FIG. 1) away from the movable pinch roller 3, and the movable pinch roller 3 is located at a position A of FIG. 2. Accordingly, the pin 26a urges the lever 27a clockwise.

The cover unit 9 is opened, the record paper PA cut in the predetermined size (hereinafter simply referred to as paper) is inserted between the plane portion 5a of the paper guide member 5 and the lower cover 9b and then the cover unit 9 is closed. Thus, the cover unit 9 is set to the position shown in FIG. 2 by the lock mechanism, not shown, and the paper PA is set between the paper pusher 9c and the paper feed roller 8 with a constant pressure.

(2) When the switch 109 is turned on, the pulse motor 10 is rotated in the direction of G in FIG. 1. The drive force of the pulse motor 10 drives the paper feed roller 8 in the direction of D through the gears 11, 12, 13, 17, 18, 19, 20 and the one-way clutch 21 so that the paper PA is moved toward the platen 1. As the pluse motor 10 is rotated by a predetermined angle, the paper PA is fed by a distance L shown in FIG. 2 and disengaged from the paper feed roller 8. However, the paper PA is stopped at the stand-by position which is the contact point of the first pinch roller 2 and the platen 1 by the reason described below. Accordingly, the paper PA slackens as shown in FIG. 2. The track of the paper PA is corrected by this slack. The operation of the movable pinch roller 3 in the paper feed operation will be described later.

(3) The rotation of the pulse motor 10 is also transmitted to the gear 26 through the gears 11, 12, 22, 23 and 24 and the friction clutch 25. As a result, the pin 26a is rotated away from the branch 27a of the lever 27 and pushes the branch 27b so that the pinch roller 3 is moved from the position A to the position B. As the pinch roller 3 is moved to the position B, the branch 27b contacts to the stopper pin (not shown) so that the rotations of the movable pinch roller 3 and the gears 26 and 24 are stopped. The pulse motor 10 further rotates but the torque thereof is absorbed because the gear 23 slips by the friction clutch 25.

(4) The rotation of the pulse motor 10 is also transmitted to the gear 15 through the gears 11, 12, 13 and 14. Since the direction of rotation of the gear 15 is opposite to the direction C and the rotation of the gear 15 is not transmitted to the platen 1 by the one-way clutch 16, the platen 1 remains stopped. Thus, the first stage of operation is terminated.

(5) Next, the pulse motor 10 is rotated in the direction H in FIG. 1 by a predetermined angle. As a result, the gear 15 is rotated in the direction C through the gears 11, 12, 13 and 14 and rotates the platen 1 in the direction C by a predetermined angle by the one-way clutch 16. As a result, the paper PA stopped at the stand-by position is fed to the space between the paper guide member 5 and the platen 1. The gear 26 is rotated in the direction C and the pin 26a moves away from the branch 27b of the lever 27 and reaches the branch 27a, and as the pulse motor 10 rotates, the movable pinch roller 3 is moved from the position B to the position A.

(6) In the course of the movement of the movable pinch roller 3, it contacts the paper PA fed by the rotation of the platen 1 and the paper PA is wrapped around the platen 1 and set in the record position. During the record operation, the paper PA is retained by the movable pinch roller 3 by a constant torque of the friction clutch 25. The contact of the movable pinch roller 3 and the paper PA is adjusted by properly setting the opening angle $\theta$ between the branches 27*a* and 27*b* of the lever 27.

At this stage, the paper feed roller 8 is stopped because the torque of the pulse motor 10 is not transmitted by the presence of the one-way clutch 21. Accordingly, during this period, the cover unit 9 may be opened to allow the loading of the next paper.

With this arrangement, the paper PA loaded in the cover unit 9 is fed to the stand-by position which is at the contact point of the platen 1 and the first pinch roller 2 by the first drive means which drives the paper feed roller 8, and the second movable pinch roller 3 is retracted from the platen 1, but the second drive means which rotates the platen 1 is not activated. Then, the paper PA is wrapped around the platen 1 which is rotated by the second drive means and fed from the stand-by position to the record position, and during the operation of the second drive means, the second movable pinch roller 3 is moved to the record position. During this period, the first drive means is not activated. Accordingly, the paper PA loaded in the cover unit 9 is automatically fed to the record position through the stand-by position. Since one of the first and second drive means is not activated while the other is activated, they do not affect to each other, and the first drive means does not affect to the record operation. Accordingly, a space efficiency is high, the automatic paper feed and the paper feed are assured and the high quality of print or record is obtained.

Further, since the first and second drive means are sequentially activated by the common drive source such as the pulse motor 10 through the one-way clutches 21 and 16 of opposite directions, the above function is attained by the simple and reliable mechanism and the compact apparatus is provided.

(7) As the above operation proceeds and the paper PA is set at the record position, the record operation is started. The carriage motor 29 is rotated, and the carriage 30 meshes with the rack gear 33 and the pinion gear 34 and is moved along the guides 31 and 32. Since the carriage motor 29 is accommodated in the carriage 30 and moves the carriage 30 which is in union with the motor 29 through the pinion gear 34 coupled to the motor 29, adjusting means for a wire or a belt used in the prior art carriage feed device is not necessary and highly reliable carriage feed is attained.

The velocity of the carriage 30 is sensed by the sensor 35 and the supply voltage to the carriage motor 29 is controlled by the output of the sensor 35 to maintain a predetermined velocity. The control means per se is similar to a known servo mechanism and hence the explanation thereof is omitted.

(8) As the carriage 30 is moved, the print or record is made by the ink jet head 28 carried by the carriage 30. At the end of one line of print or record, the pulse motor 10 is rotated in the direction H of FIG. 1 by a predetermined angle to feed the paper. By repeating the above operation, the characters or the image are printed or recorded on the paper PA. During this operation, the paper PA is retained by the movable pinch roller 3 at the constant torque set by the friction clutch 25 so that the stable paper feed is attained. Since the pulse motor 10 is excited during the stopped stated, it produces a constant torque so that the paper PA is retained by the movable pinch roller 3 through the friction clutch 25. When the pulse motor 10 rotates, the torque thereof increases but it is absorbed by the friction clutch 25. Accordingly, the retain force to the paper PA is constant, and an ununiform retain force by a retaining spring or a damage of the paper by the retaining spring, which were observed in the prior art apparatus, are prevented.

Through the above operations, the paper PA is guided by the guide members 6 and 7 and fed to the paper guide 9*e* between the transparent upper cover 9*a* and the lower cover 9*b* of the cover unit 9. During the print or record operation, the paper PA is shielded from the external. Accordingly, the external disturbance such as inadvertent touch by a hand is prevented and the paper is exactly fed. Thus, the quality of the recorded image is not degraded and the recorded characters or image can be observed through the transparent upper cover 9*a*.

As described hereinabove, according to the first aspect of the present invention, there are provided the first drive means for feeding the record paper to the stand-by position, the second drive means for feeding the record paper from the stand-by position to the record position and transport means for retracting the retaining means which retains the record paper at the record position, during the activation of the first drive means and moving the retaining means to the record position in response to the feed of the record paper during the activation of the second drive means. Accordingly, the record paper loaded in the cover unit is automatically fed to the record position through the stand-by position, and since one of the first and second drive means is not activated while the other is activated, they do not affect to each other and the first drive means does not affect to the record operation. Accordingly, the automatic paper feed and the paper feed are exactly carried out and the high quality of print or image is obtained. Further, the high space efficiency is attained and the operability in loading the record paper is significantly improved.

According to the second aspect of the present invention, there is provided the mechanism for coupling the first and second drive means to the common drive source through one-way transmission means of opposite directions so that the first and second drive means are sequentially driven by the common drive source through the one-way transmission means which are selectively activated. Accordingly, the simple and reliable automatic paper feed and paper feed mechanisms are obtained and the compact apparatus is provided.

According to the first and second aspects of the present invention, the recorder having the high space efficiency, the high reliability and the low cost is provided.

According to the present invention, the retaining means for retaining the record paper at the record position is coupled to the drive means which feed the record paper to retain the record paper by the drive force of the drive means through the friction drive mechanism. Thus, the record paper can be retained at the constant retaining force so that it is stably fed and readily combined with the automatic paper feed mechanism. By those features, the recorder having the high reliability, the high space efficiency and the low cost is provided.

According to the present invention, the paper feed-in port is formed on one side of the first cover of the cover unit and the paper feed-out port is formed between the other side of the first cover and the second cover of the cover unit. Accordingly, the record paper can be fed in and out by the simple construction of the first and second covers and the manufacturing cost of the recorder can be reduced.

By forming the second cover by the transparent member, the record operation is carried out while the operator watches the recorded image. Further, by rotatably attaching the first and second covers to the main body of the recorder, the operability in loading the record paper is improved and the feed-in and feed-out of the record paper are assured.

The recorder of the present invention can be applied to various types of printers such as an impact printer, an ink jet printer and a thermal transfer printer.

In the present specification and the appended claims, the term record means printing of characters or recording of information in a form of image, and the term record paper includes a record medium made of a material equivalent to a paper for the purpose of print.

The specific embodiments described above by no means restricts the scope of the present invention, and the present invention can be modified within the scope of the appended claims.

What is claimed is:

1. A recorder comprising:
a retainer for retaining a record bearing sheet material at a record position;
first drive means for feeding the record bearing sheet material to a stand-by position;
second drive means for feeding the record bearing sheet material from the stand-by position to the record position; and
operation means for retracting said retainer during the operation of said first drive means and moving said retainer to the record position in response to the feed of the record bearing sheet material during the operation of said second drive means.

2. A recorder according to claim 1 wherein said second drive means feeds the record bearing sheet material as the record operation proceeds.

3. A recorder according to claim 1 further comprising a common drive source for driving said first and second drive means.

4. A recorder according to claim 3 further comprising a pair of one-way transmission means of opposite directions for coupling said first and second drive means to said common drive source.

5. A recorder according to claim 1 further comprising a common drive source for driving said first drive means and said operation means.

6. A recorder according to claim 1 further comprising a common drive source for driving said second drive means and said operation means.

7. A recorder according to claim 1 further comprising a common drive source for driving said first and second drive means and said operation means.

8. A recorder according to claim 1 wherein said operation means includes a drive source and a friction drive mechanism for transmitting a drive force of said drive source to said retainer.

9. A recorder according to claim 7 further comprising a pair of one-way transmission means of opposite directions for coupling said first and second drive means to said common drive source.

10. A recorder comprising:
first drive means for feeding a record bearing sheet material to a stand-by position;
second drive means for feeding the record bearing sheet material from the stand-by position to a record position;
a reversible drive source; and
a mechanism for coupling said first and second drive means to said drive source through a pair of one-way transmission means of opposite directions so that the first drive means becomes operative while the second drive means becomes inoperative when the drive source operates in a first direction and the first drive means becomes inoperative while the second drive means becomes operative when the drive source operates in a second direction.

11. A recorder according to claim 10 wherein said second drive means feeds the sheet material as the record operation proceeds.

12. A recorder according to claim 10 further comprising retaining means for retaining the sheet material at the record position.

13. A recorder according to claim 12 further comprising operation means for retracting said retaining means during the operation of said first drive means and moving said retaining means to the record position in response to the feed of the sheet material during the operation of said second drive means.

14. A recorder according to claim 13 wherein said common drive source also drives said operation means.

15. A recorder according to claim 14 further comprising a friction drive mechanism for transmitting a drive force of said drive source to said operation means.

16. A recorder comprising:
drive means for feeding a record bearing sheet material, said drive means including a reversible drive source;
retaining means for retaining the sheet material at a record position; and
means for coupling said retaining means to said drive source through a friction drive mechanism to retain the sheet material by a drive force of said drive source, said coupling means being arranged to retract the retaining means from the record position when the drive source operates in a first direction and to return and maintain the retaining means to the record position when the drive source operates in a second direction.

17. A recorder according to claim 16 wherein said drive means further includes first drive means for feeding the sheet material to a stand-by position and second drive means for feeding the sheet material from the stand-by position to a record position.

18. A recorder according to claim 17 further comprising transport means for retracting said retaining means from the record position during the operation of said first drive means and returning said retaining means to the record position during the operation of said second drive means.

19. A recorder according to claim 17 wherein said drive means further includes a pair of one-way transmission means of opposite directions for transmitting a drive force of said drive source to said first and second drive means.

20. A recorder according to claim 19 wherein said pair of transmission means is arranged so that said first drive means becomes operative while said second drive means becomes inoperative when said drive source operates in the first direction and the first drive means becomes inoperative while the second drive means becomes operative when the drive source operates in the second direction.

21. A recorder comprising:

a cover unit having a first and a second cover to form a first room for housing therein a record bearing sheet material;

a fixed member cooperative with said first cover of said cover unit to form a second room for housing therein the sheet material; and means for movably supporting said cover unit relative to said fixed member so that said second room can be selectively released.

22. A recorder according to claim 21 wherein said second cover is made of a transparent member.

23. A recorder according to claim 21 wherein said first and second covers are formed in union.

24. A recorder according to claim 21 wherein a length of said first cover in a direction of feed of the sheet material is longer than that of said second cover.

25. A recorder according to claim 21 wherein said support means is rotatably supporting said cover unit relative to said fixed member.

26. A recorder according to claim 21 further comprising:

a feed roller for feeding the sheet material to the outside the second room, said roller being provided at said fixed member;

said cover unit further having a pressure member provided at said first cover to press the sheet material against said roller when said cover unit is moved relative to said fixed member to form said second room.

27. A recorder for recording a visible image on a record bearing sheet material comprising:

(A) first means for forming a first room to house the sheet material;

(B) second means for recording the visible image on the sheet material;

(C) third means for feeding the sheet material to said second means from said first room;

(D) fourth means for forming a second room to house the sheet material; and (E) fifth means for feeding the sheet material to said second room from said second means;

wherein said fourth means has a transparent cover member for allowing the image on the sheet material inserted into said second room to be visible from outside the second room.

* * * * *

UNITED STATES PATENT AND TRADEMARK OFFICE
CERTIFICATE OF CORRECTION

PATENT NO. : 4,581,618

DATED : April 8, 1986

INVENTOR(S) : YOSHITAKA WATANABE, ET AL.

It is certified that error appears in the above-identified patent and that said Letters Patent is hereby corrected as shown below:

Column 1, line 47, change "an external" to --the outside--.

Column 2, line 39, change "mode" to --made--.

Column 4, line 26, change "pluse" to --pulse--.

Column 6, line 3, change "stated" to --state--; and
line 18, change "external" to --outside--.

Column 10, line 4, after "outside" insert -- of --.

Signed and Sealed this

Twenty-fifth Day of November, 1986

*Attest:*

DONALD J. QUIGG

*Attesting Officer* *Commissioner of Patents and Trademarks*